United States Patent
Rhee et al.

(10) Patent No.: US 8,038,979 B2
(45) Date of Patent: Oct. 18, 2011

(54) METAL OXIDE NANO POWDER AND MANUFACTURING METHOD OF THE SAME

(75) Inventors: Chang Kyu Rhee, Daejeon (KR); Min Ku Lee, Daejeon (KR); Young Rang Uhm, Daejeon (KR); Jin Ju Park, Daejeon (KR); Byung Sun Han, Chengju-si (KR); Hi Min Lee, Seoul (KR); Seung-Hee Woo, Jinju-si (KR)

(73) Assignee: Korea Atomic Energy Research Institute, Daejeon (KR)

( * ) Notice: Subject to any disclaimer, the term of this patent is extended or adjusted under 35 U.S.C. 154(b) by 1015 days.

(21) Appl. No.: 11/979,571

(22) Filed: Nov. 6, 2007

(65) Prior Publication Data

US 2008/0193760 A1    Aug. 14, 2008

(30) Foreign Application Priority Data

Dec. 28, 2006   (KR) .................. 10-2006-0136563

(51) Int. Cl.
*C01G 9/00* (2006.01)

(52) U.S. Cl. ........... 423/592.1; 423/593.1; 423/622; 423/104; 423/102; 423/275; 423/604; 423/42; 423/35; 423/140; 423/141; 423/142; 423/144; 423/147; 423/632; 423/633; 423/634; 423/625; 423/122; 423/123; 423/124; 423/127; 977/773; 977/811

(58) Field of Classification Search ........... 423/622, 423/104, 102, 275, 604, 42, 35, 140–142, 423/144, 147, 632–634, 625, 127, 122–124, 592.1, 593.1; 977/773, 811
See application file for complete search history.

(56) References Cited

U.S. PATENT DOCUMENTS

| | | | | |
|---|---|---|---|---|
| 2,989,372 | A | * | 6/1961 | Gilbert .................. 423/627 |
| 5,102,650 | A | | 4/1992 | Hayashi et al. |

FOREIGN PATENT DOCUMENTS

| | | |
|---|---|---|
| JP | 2002-274847 | 9/2002 |
| KR | 10-1992-0006802 | 1/1991 |
| KR | 0164856 | 5/1991 |
| KR | 2002-0090657 | 12/2002 |
| KR | 10-2005-0117272 A | 12/2005 |

OTHER PUBLICATIONS

Korean Office Action issued in Korean Patent Application No. KR 10-2006-0136563, dated May 28, 2008.

* cited by examiner

*Primary Examiner* — Steven Bos
(74) *Attorney, Agent, or Firm* — McDermott Will & Emery LLP

(57) ABSTRACT

Disclosed is a method of manufacturing a metal oxide nano powder comprising preparing a first dispersed solution by adding a nano-sized metal powder to water and dispersing the metal powder within the water, performing a hydration reaction of the first dispersed solution at a temperature of about 30 to about 70° C. to generate a precipitation, and filtering and drying the precipitation to prepare a metal oxide powder. Also, disclosed is a metal oxide nano powder manufactured by the method described above, and having any one of a bar-form, a cube-form, and a fiber-form.

17 Claims, 11 Drawing Sheets

METAL OXIDE NANO POWDER AND MANUFACTURING METHOD OF THE SAME

CROSS-REFERENCE TO RELATED APPLICATION

This application claims the benefit of Korean Patent Application No. 10-2006-0136563, filed on Dec., 28, 2006, in the Korean Intellectual Property Office, the disclosure of which is incorporated herein by reference.

BACKGROUND OF THE INVENTION

1. Field of the Invention

The present invention relates to a metal oxide nano powder and manufacturing method of the same, and more particularly, to a nano-sized metal oxide and manufacturing method of the same which has a relatively large specific surface area, is economical to manufacture, and exhibits excellent chemical activity.

2. Description of Related Art

In general, a zinc oxide is used for a photocatalytic, a diluted magnetic semiconductor, and the like. Also, a zinc oxide is widely used as a fluorescent pigment and a material for a light emitting diode (LED). A copper (I) oxide ($Cu_2O$) is a p-type semiconductor material and used for a rectifier filter, which is operated using ionization property, together with copper of a transition metal. Also, $Cu_2O$ functioning to emit electrons in a photo-cell is used for a material of a photo-cell, a pigment for preventing corrosion, a cathode for a lithium-ion battery, and a catalyst for conversion of a solar energy.

A zinc oxide and a copper (II) oxide (CuO) are manufactured by heating a zinc metal and a copper metal in air. $Cu_2O$ may be manufactured by adding hydrazine to a copper (II) acetate solution, by heating a Fehling's solution with glucose added or by performing a chemical reaction using copper hydroxide ($Cu(OH)_2$).

However, conventional methods for manufacturing metal oxide powder as described above are unsuitable for a large-quantity production process due to cost increase and complexity in the manufacturing process. Specifically, the above-mentioned conventional manufacturing methods are suitable for manufacturing a metal oxide powder having a particle size greater than or equal to a micron sized particle. However, the conventional manufacturing method is unsuitable for manufacturing a metal oxide powder having nano-sized particles or having specific shaped particles transformed to a bar-form or a wire-form. Also, a zinc oxide doped with a metal is difficult to be manufactured through the conventional manufacturing methods due to a significantly low melting point and boiling point of zinc.

Generally, since alumina has high thermal resistance, chemical resistance, corrosion resistance, and high strength, it is used, often in a fiber form, as a catalyst for decomposition of organic matters related to environmental pollution, a high functional filter, and a reinforcement agent for composite materials, and also used in the formation of gas separation membranes. An iron oxide having high thermal resistance, chemical resistance, corrosion resistance, and high strength is mainly classified into hematite ($\alpha$-$Fe_2O_3$) and maghemite ($\gamma$-$Fe_2O_3$) which are used as a catalyst for a magnetic recording media and petrochemistry due to magnetic properties, and ferrite-based magnetite ($Fe_3O_4$), which is applied to a magnetic toner and a drug delivery medium. These iron oxides advantageously have large-energy products, reduced costs of materials, reduced material instability, reduced weight of materials, and exhibit corrosion resistance. Also, these iron oxides are manufactured in a bar-form, a fiber-form, and a wire-form, and thus, applicably used for magnetic materials, printing recording materials, bio-materials, and the like. As methods for manufacturing an alumina fiber or an iron oxide bar described above, a melt spinning method, a sol-gel method, an extrusion method, and the like, are widely used.

The sol-gel method refers to as a method using a phenomenon in which a chain reaction occurring by an alcohol oxide is maintained in a solution, that is, 'sol', where colloidal particles, inorganic particles, and solid particles are dispersed so that the dispersed solid materials are polymerized, and thereby a fluid gel having a consecutive solid retina structure is obtained.

However, conventional fiber manufacturing methods such as the sol-gel method, the melt spinning method, and the extrusion method have problems in that the manufacturing process is complex, and the manufacturing costs are increased. In addition, because alumina fibers and iron oxide bars manufactured by the conventional fiber manufacturing methods have micrometer or sub-micrometer particle sizes, the alumina fiber and iron oxide bars do not advantageously increase in the specific surface areas compared with the nano-sized particles nor increase in the mechanical property value.

Currently, manufacturing methods of powdering various kinds of metals such as aluminum, iron, copper, and zinc in order to get nano-sized particles have been developed. This is because when a metal is powdered to have nano-sized particles, mechanical properties such as hardness, strength, abrasion resistance are improved, and physical properties such as chemical and electromagnetic properties are improved, showing an increase in the thermal expansion coefficient, a reduction in activation energy, and the like, in comparison with the existing materials.

Also, when a zinc oxide or a zinc oxide doped with transition metals such as aluminum, iron, and the like, is manufactured in a bar-form having a particle size of several to tens of nano-meters, the mechanical property value is improved, and a range of the application is expanded due to fine constituting particles of the zinc oxide.

However, conventional manufacturing methods for metal oxide have a shortcoming in that a particle of a nano-sized metal oxide is difficult to be shaped. Also, a conventional composite method of a nano-sized inorganic crystal is difficult to be applied to manufacturing methods of a nano-sized metal oxide having a nano sized bar-form, a nano sized cube-form, or a nano sized fiber-form due to the disadvantages described above. Therefore, there is a need for a manufacturing method of a nano sized metal oxide which is simple, economical, and effective in the manufacturing process.

SUMMARY OF THE INVENTION

An aspect of the present invention provides a metal oxide nano powder and manufacturing method of the same, in which particles of a metal oxide are manufactured in a nano-sized bar-form, cube-form, or fiber-form by using fine metal particles.

An aspect of the present invention also provides a manufacturing method of a zinc oxide doped with a metal having a nano-sized bar-form by using fine zinc and metal particles.

According to an aspect of the present invention, there is provided a method of manufacturing a metal oxide nano powder, comprising: pre paring a first dispersed solution by adding a nano-sized metal powder to water and dispersing the metal powder within the water; performing a hydration reaction of the first dispersed solution at a temperature of about 30 to about 70° C. to generate a precipitation; and filtering and drying the precipitation to prepare a metal oxide powder.

In this instance, the metal oxide nano powder comprises at least one powder selected from the group consisting of zinc powder, copper powder, iron powder, and aluminum powder.

Also, the preparing of the first dispersed solution comprises adding about 0.1 to about 1 part by weight of the metal powder to about 100 parts by weight of the water, and a diameter of the metal powder is about 1 to about 500 nm.

Also, the hydration reaction is performed for about 1 to about 40 hours, and the preparing of the first dispersed solution further comprises adding an additive to the first dispersed solution. The additive includes acetic acid.

Also, the metal oxide nano powder has any one of a bar-form, a cube-form, and a fiber-form. The metal oxide nano powder with the bar-form has an average thickness of about 30 to about 80 nm, and an average length of about 300 to about 800 nm. The metal oxide nano powder with the cube-form has a cubic crystal structure and a diameter of about 20 to about 50 nm. The metal oxide nano powder with the fiber-form has an average diameter of about 2 to about 4 nm and an average length of about 20 to about 100 nm.

Also, the method of manufacturing a metal oxide nano powder further comprises thermally treating the metal oxide powder at a temperature of about 100 to about 600° C. after the drying, and the thermally treating is performed for about 0.5 to about 2 hours.

According to another aspect of the present invention, there is provided a method of manufacturing a zinc oxide nano powder doped with a metal, comprising: preparing a second dispersed solution by adding a nano-sized zinc powder and a nano-sized metal powder to water and dispersing the zinc powder and the metal powder within the water; generating a precipitation by stirring the second dispersed solution at a temperature of about 30 to about 70° C. for a predetermined time period; and filtering and drying the precipitation to prepare a zinc oxide powder doped with a metal.

In this instance, the doping metal powder comprises at least one metal selected from the group consisting of iron, manganese, nickel, cobalt, chrome, titanium, niobium, indium, zirconium, and aluminum. The metal powder of about 3 to about 10 wt % is added with respect to the zinc powder, however, the kind and amount of elements to be doped on the zinc oxide powder may be outside the range of about 3 to about 10 wt %, as necessary, and thus, the present invention is not limited thereto.

Also, the preparing of the zinc oxide powder further comprises thermally treating after the drying, and the thermally treating is performed at a temperature of about 100 to about 400° C.

According to another aspect of the present invention, there is provided a metal oxide nano powder having any one of a bar-form, a cube-form, and a fiber-form, and the metal oxide nano powder is a zinc oxide, an iron oxide, a copper (I) oxide, an alumina, or a mixed powder thereof.

In this instance, the zinc oxide powder has a nano bar-form with an average thickness of about 30 to about 80 nm and an average length of about 300 to about 600 nm, and the zinc oxide powder comprises a zinc oxide powder doped with at least one metal selected from the group consisting of iron, manganese, nickel, cobalt, chrome, titanium, niobium, indium, zirconium, and aluminum.

Also, the iron oxide powder has a bar-form with an average diameter about 30 to about 80 nm and an average length of about 500 to about 800 nm.

Also, the alumina powder has a fiber-form with an average diameter of about 2 to about 4 nm and an average length of about 20 to about 100 nm.

Also, the copper (I) oxide powder has a lattice structure of cubic system with $a_o$=4.264 Å (where "$a_o$" denotes a lattice parameter), a diameter of about 20 to about 50 nm, and a shape of a cube-form.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EXEMPLARY EMBODIMENTS

Figure 1:
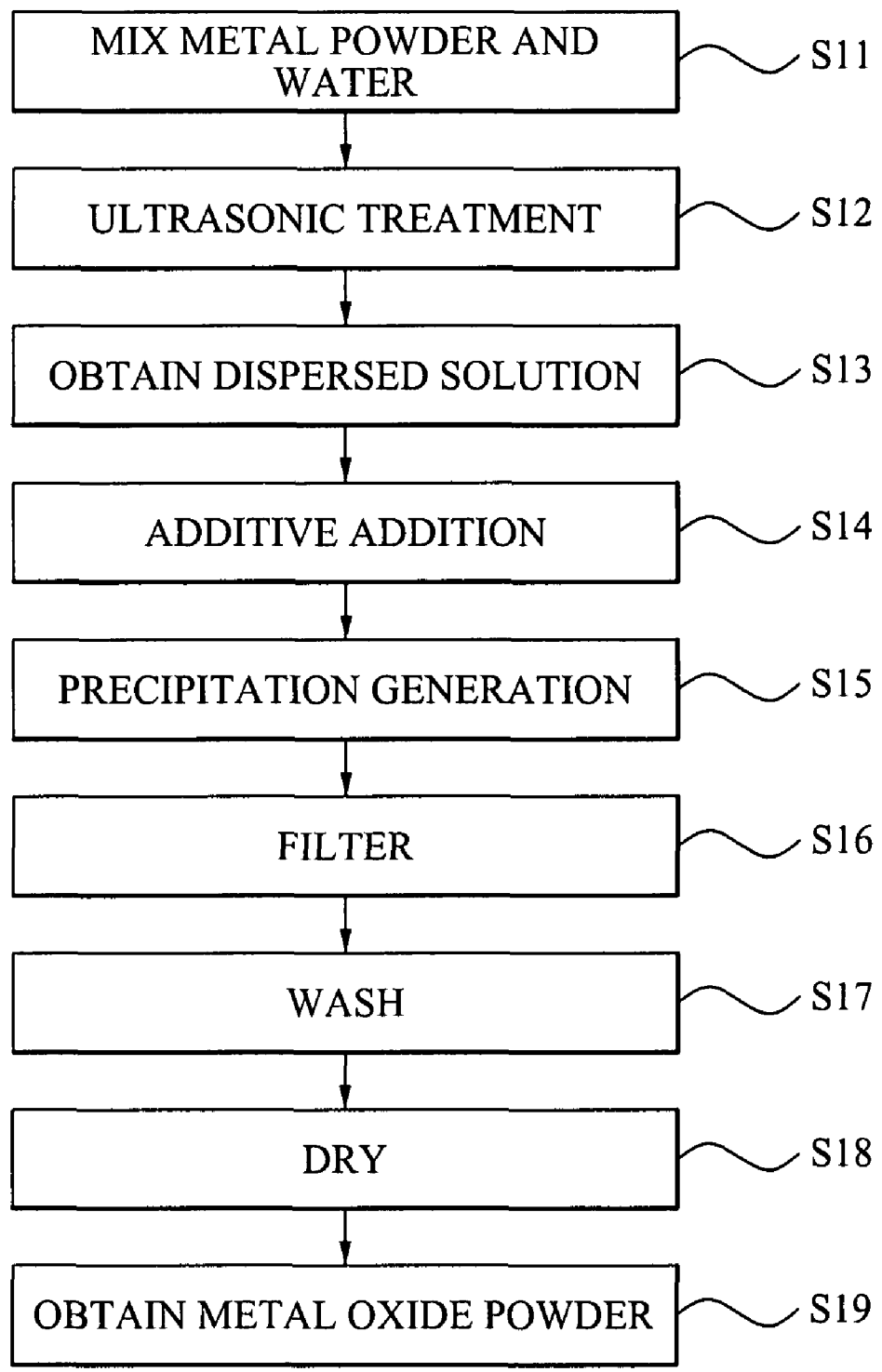
FIG. 1 is a flowchart illustrating a manufacturing process of a nano-sized metal oxide powder according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A method of manufacturing a metal oxide nano powder according to an exemplary embodiment of the invention comprises preparing a first dispersed solution by adding a nano-sized metal powder to water and dispersing the metal powder within the water, performing a hydration reaction of the first dispersed solution at a temperature of about 30 to about 70° C. to generate a precipitation, and filtering and drying the precipitation to prepare a metal oxide powder.

A method of manufacturing a zinc oxide nano powder doped with a metal according to another embodiment of the invention comprises preparing a second dispersed solution by adding a nano-sized zinc powder and a nano-sized metal powder to water and dispersing the zinc powder and the metal powder within the water, generating a precipitation by stirring the second dispersed solution at a temperature of about 30 to about 70° C. for a predetermined time period, and filtering, drying and thermally treating the precipitation to prepare a zinc oxide powder doped with a metal. The thermally treating is performed at a temperature of about 100 to about 400° C., and is preferably performed at about 300 to 400° C., even though the temperature varies depending on the kind and amount of elements to be doped on the zinc oxide powder.

The first dispersed solution is not added with elements to be doped, and the second dispersed solution is added with elements to be doped. A transition metal such as iron and aluminum are used as the elements to be doped.

The metal nano powder used in the present embodiment of the invention may be manufactured using an electrical explosion technique, a dry smelting technique, a floating gas condensation technique, and the like. It is preferable that the metal powder manufactured by the floating gas condensation technique or the electrical explosion technique is used.

The electrical explosion technique for manufacturing a nano-sized metal powder is disclosed in Korean Published Application No. 2001-29606. And also the conventional manufacturing method of the nano-sized metal powder may be used as is, or suitably modified and used.

When using the floating gas condensation technique and electrical explosion technique, a large-quantity of the nano-sized metal powder are readily manufactured. In addition, a specific surface area of the manufactured powder is about 14 $m^2/g$, which is greater than those of commercial metal powders. The manufactured metal powder may be shielded from a complete oxidation by the formation of a thin oxide surface passivation layer of about 1 to 3 nm, allowing the metal nano powder to be readily handled even in air.

Commercial metal powder has a diameter of about 50 μm. When the commercial metal powder is used for the manufacturing of metal oxide powder of the present embodiment of the invention, the time required to the finish of precipitation generation needs a relatively long period of about 3 to 4 days. Thus, it is preferable that a metal powder having a nano-size is used for manufacturing of a metal oxide nano powder.

The nano-sized metal powder according to the present embodiment of the invention has a diameter of about 1 to 500 nm, and preferably about 10 to 100 nm. When the diameter of the nano-sized metal powder is less than 1 nm, the operability and productivity are deteriorated, and when the diameter is greater than 500 nm, the operation time is increased.

In the method of manufacturing a metal oxide nano powder according to the present embodiment of the invention, the water used in the preparing of the first dispersed solution is a medium for dispersing the nano-sized metal powder, and at the same time is a reaction product in the subsequent operation, that is, the performing of the hydration reaction. Also, the water is a mother liquid where crystal grains of the metal oxide and the zinc oxide doped with the metal finally obtained are grown. Accordingly, it is required to prevent impurities from entering into the water. 1 t is preferable that purified water or distilled water is used in the preparing of the first dispersed solution. Here, there is not a particular limitation for the purification level of the water, and thus, the purification level may be readily selected by one skilled in the art depending on conditions such as production equipments, a range where the crystal grain of the nano-sized metal oxide is grown, and the like.

A temperature of the water used in the preparing of the first dispersed solution does not have a particular limitation, however, is preferably about 40 to 60° C. when taking into consideration a temperature condition for the performing of the hydration reaction.

There is not a particular limitation on a method for dispersing powder within the water which is operated in the performing of the hydration reaction, however, a dispersion method using ultrasonic treatment is preferably used when taking into consideration that the nano-sized metal powder must be evenly dispersed, and impurities must be prevented from entering into the dispersion medium, that is, the water described above.

A quantity of the nano-sized metal powder which is dispersed within the water in the performing of the hydration reaction is not required to have a particular limitation as long as it can be dispersed within the water, and the crystal grain of the metal oxide having a nano sized bar-form, cube-form, or fiber-form according to the present embodiment of the invention can be finally obtained. However, it is preferable that 0.2 to 0.4 parts by weight of the metal powder is added with respect to 100 parts by weight of the water when taking into consideration profitability and efficiency in the production process. When an amount of the metal powder dispersed in 100 parts by weight of the water is less than 0.1 parts by weight, a quantity of the metal oxide generated by a one-time reaction is insufficient, and when the amount of the metal powder is greater than 1 part by weight, a quantity of the metal which is not subjected to the reaction is uneconomically increased even though the time required for the reaction and precipitation is increased in the performing of the hydration reaction as shown in Formula 1 below. In addition, it is disadvantageously required for a separate process where a non-reacted metal is recovered from the precipitation obtained in the performing of the hydration reaction and then reused.

Hereinafter, in the performing of the hydration reaction, each precipitation reaction in response to specific metal kinds will be described in detail.

Zinc and copper are reacted with water respectively to precipitate a zinc oxide and a copper (I) oxide ($Cu_2O$), and the reaction is represented by formulas below.

$$Zn + H_2O \rightarrow ZnO + H_2 \quad \text{[Formula 1]}$$

$$2Cu + H_2O \rightarrow Cu_2O + H_2 \quad \text{[Formula 2]}$$

In the method of manufacturing the metal oxide nano powder according to the present embodiment of the invention, the performing of the hydration reaction generates and precipitates a zinc oxide and $Cu_2O$ via Formula 1 and Formula 2 by stirring a dispersed solution in the presence of an additive and a catalyst of the precipitation reaction while maintaining a temperature of about 30 to 70° C. Here, the dispersed solution is the result obtained from the preparing of the first dispersed solution.

When 1 to 2 parts by weight of an iron powder is added to 1000 parts by weight of the dispersed solution, iron (II) hydroxide ($Fe(OH)_2$) is generated in a precipitation process and then iron oxy-hydroxide (FeO(OH)) is generated, and which is represented by formula below.

$$2Fe + 2H_2O \rightarrow 2Fe(OH) + H_2 \quad \text{[Formula 3]}$$

$$2Fe(OH) + 2H_2O \rightarrow 2Fe(OH)_2 + H_2$$

$$4Fe(OH)_2 + O_2 \rightarrow 4FeO(OH) + 2H_2O$$

Here, when an amount of the iron powder is less than 1 part by weight with respect to 1000 parts by weight of the dispersed solution, a quantity of the generated FeO(OH) is insufficient due to the small amount of iron powder, and conversely, when the amount of the iron powder is greater than 2 parts by weight, Fe(OH)$_2$ is apt to be converted into iron (I) hydroxide (Fe(OH)$_3$) rather than FeO(OH), and which is represented by formula below.

$$2Fe(OH)_2 + 2H_2O \rightarrow 2Fe(OH)_3 + H_2 \qquad \text{[Formula 4]}$$

Fe(OH)$_3$ is generated into a powder having a spherical shape which is different from a bar shape or an acicular shape. Fe$_2$O$_3$ obtained by thermally treating Fe(OH)$_3$ is also a spherical shaped powder, and whose specific surface area is a relatively low 16 m$^2$/g on average, and hence, adversely affects the manufacture of a bar-shaped metal oxide powder having a maximized specific surface area.

When 1 to 3 parts by weight of an aluminum powder is added to 1000 parts by weight of distilled water, aluminum hydroxide (AlOOH) is generated, which is represented by formula below.

$$2Al + 4H_2O \rightarrow 2AlOOH + 3H_2 \qquad \text{[Formula 5]}$$

Here, when an amount of the aluminum powder is less than 1 part by weight with respect to 1000 parts by weight of the distilled water, a quantity of the generated AlOOH is insufficient due to the small amount of aluminium, and conversely when the amount of the aluminum powder is greater than 3 p arts by weight, AlOOH is undesirably converted into Al(OH)$_3$, which is represented by formula below.

$$2Al + 6H_2O \rightarrow 2Al(OH)_3 + 3H_2 \qquad \text{[Formula 6]}$$

When AlOOH having an orthorhombic crystal structure is subjected to thermal-treatment, an alumina fiber whose specific surface area reaches about 300 to 600 m$^2$/g is generated. However, when Al(OH)$_3$ having a monoclinic crystal structure is subjected to thermal-treatment, an alumina fiber whose specific surface area is 200 m$^2$/g is generated. Thus, when manufacturing an alumina fiber, 1 to 3 parts by weight of a nano-sized aluminum powder is added to 1000 parts by weight of the distilled water, so that AlOOH having a relatively high specific surface area is maximally generated in the precipitation process, while Al(OH)$_3$ having a relatively low specific surface area is prevented from being generated.

An additive for promoting precipitation reaction may be used in the performing of the hydration reaction. There is not a particular limitation for a kind and amount of the additive as long as the additive can act as a catalyst for the precipitation reaction. An acid catalyst such as acetic acid is mainly used, and whose quantity is desirably about 0.1 to 0.8 mL with respect to the dispersed solution of 1000 mL. Specifically, when manufacturing an iron oxide powder, a small quantity of the acetic acid may be added in order to remove an oxide layer coated on the iron powder, and when manufacturing an alumina powder, the additive does not have to be added.

In the performing of the hydration reaction, a temperature of the dispersed solution is maintained at about 30 to 70° C. while generating a precipitation. When the precipitation reaction is performed at temperature below 30° C., the speed of the reaction is too slow, thereby deteriorating productive efficiency, and when performed at temperature over 70° C., the speed of reaction does not increase with respect to the temperature any more, so it is inefficient in view of energy management. A desirable temperature range may vary depending on the kind of the specific metal powder within about 30 to 70° C. For example, when performing precipitation reaction of aluminum, a temperature of the dispersed solution is preferably maintained at about 30 to 40° C. When performing precipitation reaction of iron, the temperature of the dispersed solution is preferably about 40 to 60° C. Also, when performing precipitation reaction of copper or zinc, the temperature of the dispersed solution is preferably about 30 to 70° C.

In the performing of the hydration reaction, when the dispersed solution is stirred at a temperature of about 30 to 70° C. for a predetermined time period, a precipitation is generated. The time period of the hydration reaction may vary according to whether the additive is used, the kind and amount of the additive, production conditions, and the like. However, when the time period of the hydration reaction is significantly short, a precipitation amount of a metal oxide is insufficient, and conversely, when the time period of the hydration reaction is significantly long, productive efficiency and operation efficiency are deteriorated. Thus, the dispersed solution is stirred for about 1 to 40 hours according to the present exemplary embodiment of the invention. Here, the time period of the hydration reaction may vary according to amount of a reaction product, and thus, is not limited thereto.

The reason why the precipitation described above is not generated immediately but generated in a predetermined time period is because a relatively high energy-barrier exists for the precipitation reaction. Thus, the energy-barrier is reduced by using an additive such as a catalyst, or energy for overcoming the energy-barrier is supplied to the reaction product by raising the reaction temperature, so that the standing time required till completion of the performing of the hydration reaction can be reduced.

The manufacturing of a metal oxide nano powder or a zinc oxide nano powder doped with a metal such as iron is the purpose of the present invention. However, when the speed of the precipitation reaction is too fast, the purpose of the present invention is difficult to be attained due to uneven growth of the metal oxide particles. Therefore, according to the present exemplary embodiment of the invention, the manufacturing of the metal oxide nano powder should be performed taking into consideration whether an additive is used in the performing of the hydration reaction, the kind and amount of the additive, a reaction temperature, and the like.

According to the present embodiment of the invention, the filtering and drying of the precipitation obtained from the performing of the hydration reaction results in a metal oxide powder having a nano-sized bar-form, cube-form, or fiber-form. The filtering is performed using a filtering medium having a plurality of pores of about 0.1 μm formed thereon, taking into consideration filtering efficiency. The filtered result is washed with purified water, and then dried in an oven at a temperature of about 50 to 70° C., thereby obtaining a metal hydroxide or a metal oxide powder.

After the drying, the metal oxide powder may be further subjected to thermal-treatment. Here, the thermal-treatment is performed at a temperature of about 100 to 600° C., however, a range of the temperature may vary according to the kind of the metal oxide powder. For example, a temperature of the thermal-treatment of the zinc oxide is about 100 to 400° C., the temperature of the thermal-treatment of an iron oxide is about 200 to 400° C., and the temperature of the thermal-treatment of the alumina is about 300 to 600° C.

As described above, in the case of the iron oxide, a precipitation reaction is performed by adding an iron powder to distilled water, thereby generating an FeO(OH) powder. Next, the FeO(OH) powder is dried, and the dried FeO(OH) powder is subjected to the thermal-treatment at a temperature of about 200 to 400° C. for about one hour, thereby obtaining a nano iron oxide bar having an acicular-shape. In this instance, the nano iron oxide bar has a phase of pure maghemite (γ-Fe$_2$O$_3$) or hematite (α-Fe$_2$O$_3$), or mixed phase of maghemite (γ-Fe$_2$O$_3$) and hematite (α-Fe$_2$O$_3$). The thermal-treatment described above is preferably performed at a temperature of about 200 to 400° C. This is because when the thermal-treatment is performed at a temperature of less than 200° C., sufficient calcination of the FeO(OH) powder is not ensured, and when the thermal-treatment is performed at a temperature of over 400° C., the FeO(OH) powder is converted into $Fe_3O_4$ having a spherical shape which is different from the bar shape, thereby reducing the specific surface area. Here, the type of phase formed among the $\gamma$-$Fe_2O_3$ phase, $\alpha$-$Fe_2O_3$ phase and mixed phase of $\gamma$-$Fe_2O_3$ and $\alpha$-$Fe_2O_3$ is determined by the thermal treatment atmosphere. When the FeO(OH) is subjected to thermal-treatment under a nitrogen atmosphere at a temperature of about 200 to 400° C. after vacuum sealing, the FeO(OH) powder is converted into pure $\gamma$-$Fe_2O_3$. However, when the FeO(OH) powder is subjected to thermal-treatment in air, a part of $\gamma$-$Fe_2O_3$ converted from the FeO(OH) powder is further converted into $\alpha$-$Fe_2O_3$ due to a metastability of $\gamma$-$Fe_2O_3$ phase during the thermal-treatment. As a result, the nano iron oxide bar is manufactured in the form of a mixture of $\alpha$-$Fe_2O_3$ and $\gamma$-$Fe_2O_3$.

Also, in the case of alumina, AlOOH generated via the precipitation reaction is dried, and is subjected to thermal-treatment at a temperature of about 300 to 600° C. for about one hour, thereby obtaining a nano alumina fiber having an acicular shape.

FIG. 1 is a flowchart illustrating a manufacturing process of a nano-sized metal oxide powder according to an exemplary embodiment of the present invention. The method of manufacturing a metal oxide powder according to an exemplary embodiment of the invention will be described hereinafter with reference to FIG. 1.

A nano-sized metal powder and water are mixed in operation S11, and the mixed metal powder and the water are subjected to ultrasonic treatment in operation S12, thereby preparing a first dispersed solution in operation S13. Next, an additive is added to the first dispersed solution in operation S14, thereby generating a precipitation in operation S15. Next, the precipitation is filtered in operation S16, and the filtered precipitation is washed in operation S17 and dried in operation S18, thereby obtaining a metal oxide powder in operation S19.

Figure 2:
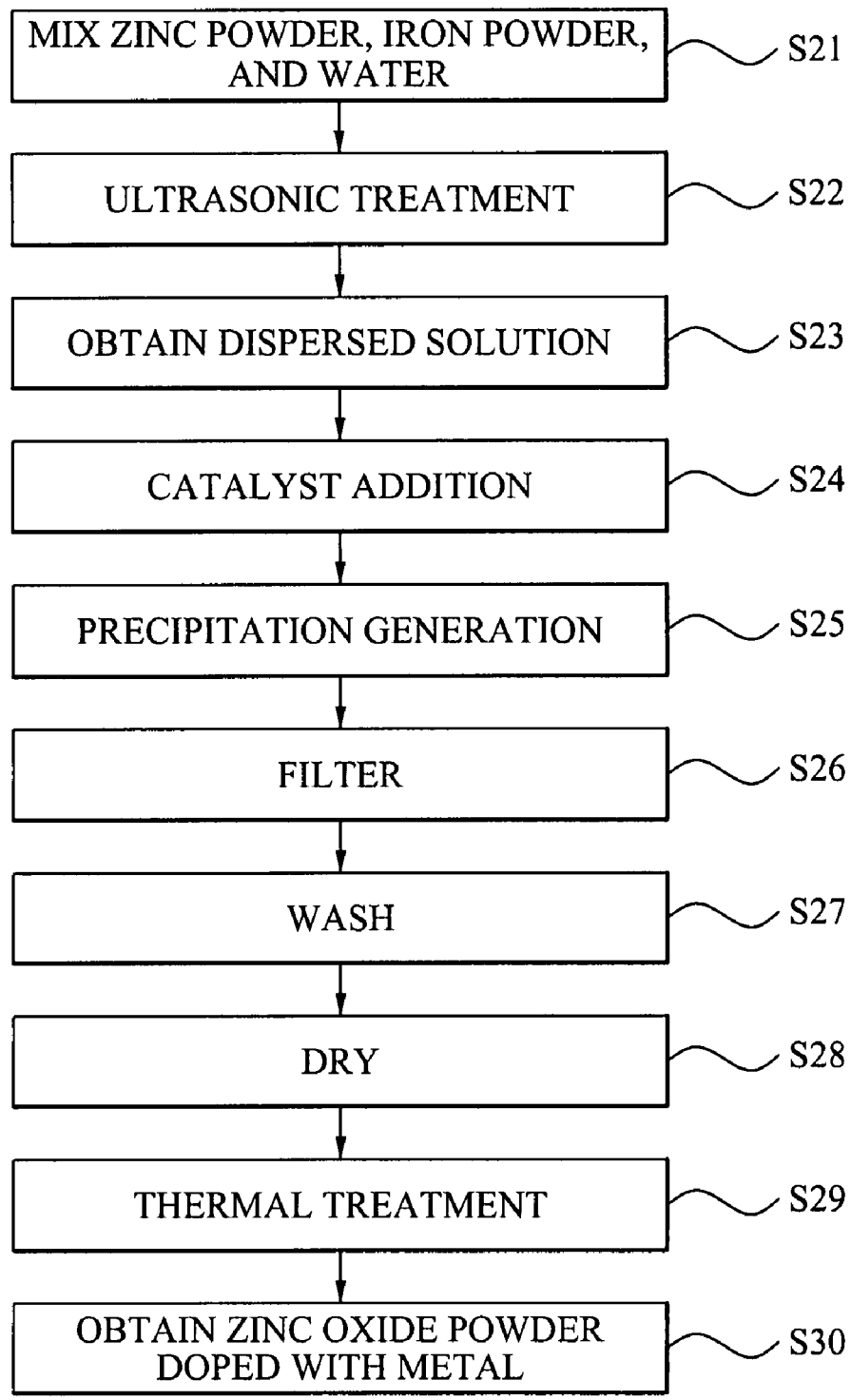
FIG. 2 is a flowchart illustrating a manufacturing process of a zinc oxide powder doped with iron having a nano sized bar-form according to an exemplary embodiment of the present invention.

FIG. 2 is a flowchart illustrating a manufacturing process of a zinc oxide powder doped with iron having a nano sized bar-form according to an exemplary embodiment of the present invention.

Referring to FIG. 2, a nano-sized zinc powder, a nano-sized iron powder, and water are mixed in operation S21, and the mixed zinc powder, iron powder, and water are subjected to ultrasonic treatment in operation S22, thereby obtaining a second dispersed solution in operation S23. Next, a catalyst is added to the second dispersed solution in operation S24, thereby generating a zinc oxide precipitation in operation S25. Next, the zinc oxide precipitation is filtered in operation S26, and the filtered precipitation is washed in operation S27, dried in operation S28, and subjected to thermal-treatment in operation S29, thereby obtaining a zinc oxide powder doped with a metal in operation S30. The thermal-treatment does not have to be performed according to the kind and amount of the metal to be doped, however, in the case of iron to be doped, the thermal-treatment is performed at a temperature of about 100 to 400° C. for a predetermined time period.

Hereinafter, the method of manufacturing the metal oxide nano powder will be described in detail through Examples which will be shown below. However, these Examples are merely examples for describing the present invention, and the present invention is not limited by any of these Examples.

EXAMPLE 1

About 1 g of nano-sized zinc powder was added to about 1000 g of distilled water at about 60° C. and contained in a predetermined reaction vessel. Here, the nano-sized zinc powder, which was manufactured by the gas condensation technique, had a spherical shape, and whose specific surface area was about 14 $m^2/g$ measured by the Brunauer-Emmet-Teller (BET) technique. The zinc powder was dispersed by performing ultrasonic treatment on the reaction vessel for about 10 minutes, thereby preparing a dispersed solution. Next, about 0.2 mL of an acetic acid acting as a catalyst for precipitation reaction was added to the dispersed solution, and the dispersed solution was stirred for 6 hours while maintaining a temperature of the dispersed solution at about 60° C., thereby precipitating a zinc oxide. Next, the precipitated zinc oxide was filtered through a filter paper having a plurality of pores of about 0.1 μm formed thereon, and washed with purified water. Next, the washed zinc oxide was dried in an oven heated to about 60° C. for about 12 hours, thereby obtaining a nano-sized zinc oxide powder having a bar-form.

Table 1 below shows a total mass of the zinc oxide powder measured after drying the zinc oxide powder. Also, each relative content of zinc and a zinc oxide, which were contained in the zinc oxide powder, was measured using a X-ray diffractometer (Rigaku D/Max III, manufactured by Rigaku Corporation of Japan, Ni-filter, CuKa-radiation), and the results are shown in Table 1below.

Figure 3:
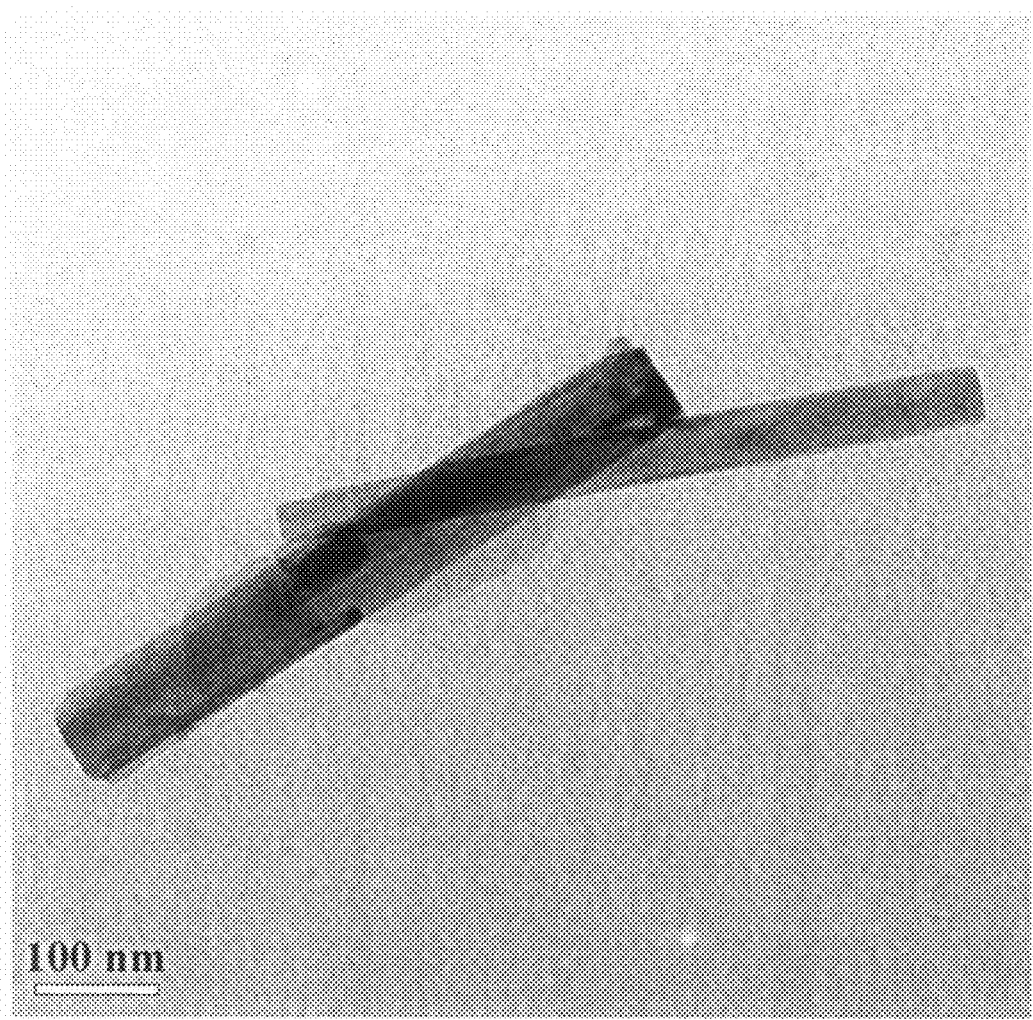
FIG. 3 is a photograph taken by a transmission electron microscope showing a zinc oxide powder according to Example 1.

The morphology and the particle sizes of the zinc oxide powder were observed by a transmission electron microscope (JEM2000, JEOL, Japan), which is shown in a photograph of FIG. 3. Here, the observation magnification was 300,000 times, and a particle of the zinc oxide powder was formed into a bar-shape. An average thickness of the particle of the zinc oxide powder was about 60 nm, and an average length thereof was about 400 nm.

EXAMPLE 2

A zinc oxide powder was manufactured in the same manner as in Example 1 except that an amount of 2 g of the nano-sized zinc powder was added to about 1000 g of the distilled water. After drying the zinc oxide powder, a total mass of the zinc oxide powder and each relative content of zinc and a zinc oxide contained in the zinc oxide powder were measured in the same manner as in Example 1, and the results are shown in Table 1 below.

EXAMPLE 3

A zinc oxide powder was manufactured in the same manner as in Example 1 except that an amount of about 3 g of the nano-sized zinc powder was added to about 1000 g of the distilled water. After drying the zinc oxide powder, a total mass of the zinc oxide powder and each relative content of zinc and a zinc oxide contained in the zinc oxide powder were measured in the same manner as in Example 1, and the results are shown in Table 1 below.

EXAMPLE 4

A zinc oxide powder was manufactured in the same manner as in Example 1 except that an amount of about 4 g of the nano-sized zinc powder was added to about 1000 g of the distilled water. After drying the zinc oxide powder, a total mass of the zinc oxide powder and each relative content of zinc and a zinc oxide contained in the zinc oxide powder were measured in the same manner as in Example 1, and the results are shown in Table 1 below.

EXAMPLE 5

A zinc oxide powder was manufactured in the same manner as in Example 1 except that an amount of about 6 g of the nano-sized zinc powder was added to about 1000 g of the distilled water. After drying the zinc oxide powder, a total mass of the zinc oxide powder and each relative content of zinc and a zinc oxide contained in the zinc oxide powder were measured in the same manner as in Example 1, and the results are shown in Table 1 below.

EXAMPLE 6

A zinc oxide powder was manufactured in the same manner as in Example 1 except that an amount of about 10 g of the nano-sized zinc powder was added to about 1000 g of the distilled water. After drying the zinc oxide powder, a total mass of the zinc oxide powder and each relative content of zinc and a zinc oxide contained in the zinc oxide powder were measured in the same manner as in Example 1, and the results are shown in Table 1 below.

TABLE 1

|  | Example 1 | Example 2 | Example 3 | Example 4 | Example 5 | Example 6 |
|---|---|---|---|---|---|---|
| Amount of zinc powder per water of 1000 g (g) | 1 | 2 | 3 | 4 | 6 | 10 |
| Total mass after drying zinc oxide powder (g) | 0.8 | 2.1 | 3.2 | 4.4 | 6.7 | 11.5 |
| Amount of zinc within zinc oxide powder (%) | 0 | 0 | 0 | 0 | 24 | 41 |
| Amount of zinc oxide within zinc oxide powder (%) | 100 | 100 | 100 | 100 | 76 | 59 |

As can be seen in Table 1, in the case of Examples 1 through 4 in which about 1 g through 4 g of the nano-sized zinc powder was respectively added to about 1000 g of the distilled water, zinc, that is, a reaction product was oxidized into a zinc oxide without a non-reacted zinc powder. However, in the case of Examples 5 and 6 in which about 6 g and 10 g of the zinc powder was respectively added to about 1000 g of the distilled water, a relatively large amount of a non-reacted zinc powder was left within the obtained zinc oxide powder. Thus, it was found that more time was required for completion of the precipitation reaction in Examples 5 and 6 than in Examples 1 through 4. Also, in the case of Example 1, since the amount of 1 g of the nano-sized zinc powder was relatively low, an amount of the zinc oxide powder lost during collecting the manufactured zinc oxide powder was relatively increased in comparison with that in other Examples, and accordingly the total mass of the zinc oxide powder measured after drying the obtained zinc oxide powder was reduced.

EXAMPLE 7

Figure 4:
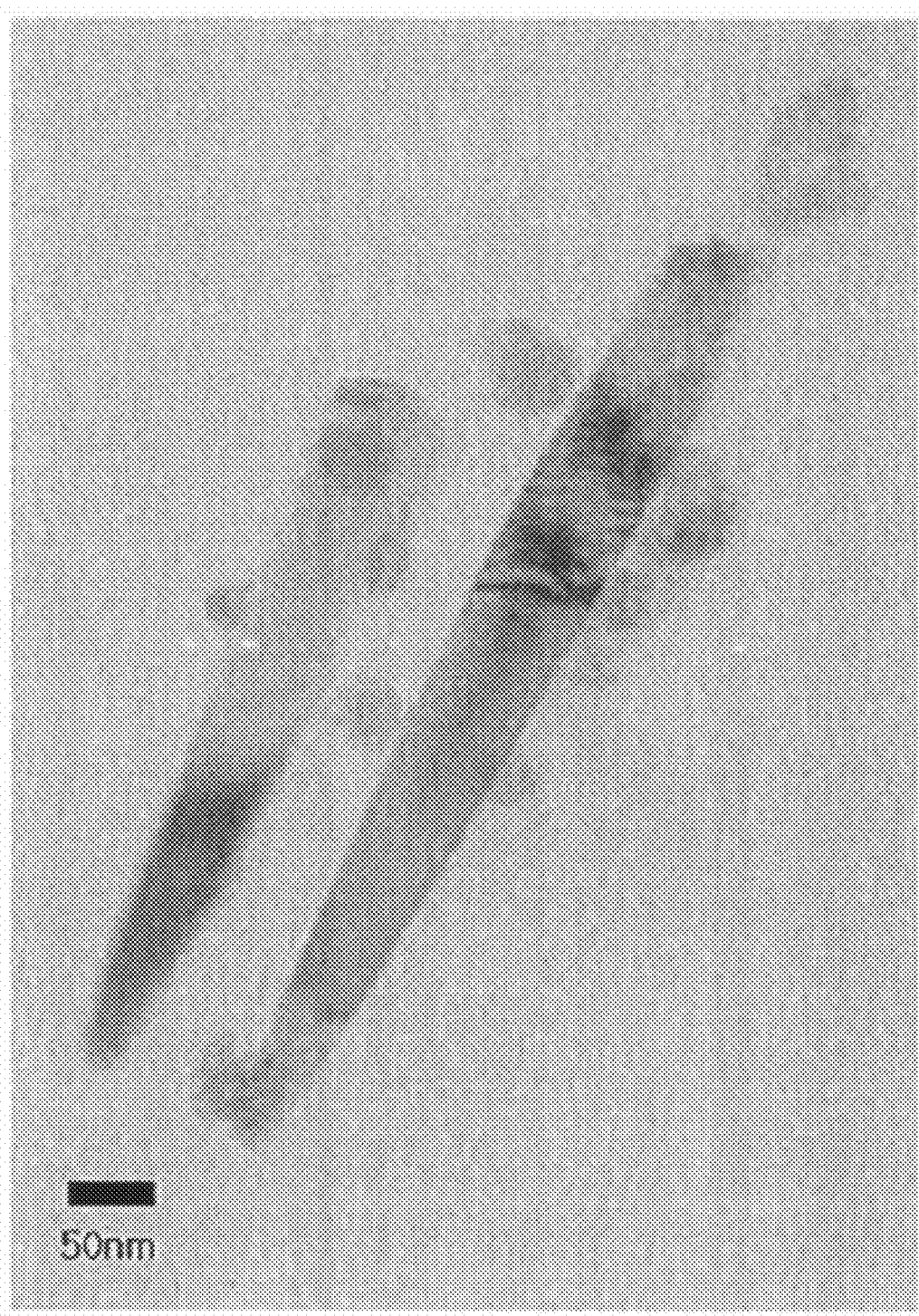
FIG. 4 is a photograph taken by a transmission electron microscope showing a zinc oxide powder doped with a metal according to Example 8.

About 4 g of nano-sized zinc powder and about 0.2 g of nano-sized iron powder were added to about 1000 g of distilled water at about 60° C. and contained in a predetermined reaction vessel. The zinc and iron powders dried after hydrolysis were subjected to thermal-treatment at about 350° C., thereby obtaining a zinc oxide powder doped with an iron having a nano-sized bar-form. Each relative amount of an iron oxide and a zinc oxide which are contained within the zinc oxide powder doped with an iron was measured in the same manner as in Example 1, and the results are shown in Table 2 below. Also, the morphology and the particle sizes of the zinc oxide powder doped with an iron were observed by a transmission electron microscope (JEM2000, JEOL, Japan), which is shown in a photograph of FIG. 4. Here, the observation magnification was 300,000 times, and a particle of the zinc oxide powder doped with the iron was formed into a bar-shape. An average thickness of the particle of the zinc oxide powder was about 50 nm, and an average length thereof was about 350 nm.

EXAMPLE 8

About 4 g of the nano-sized zinc powder and about 0.4 g of the nano-sized iron powder were added to about 1000 g of the distilled water at about 60° C. contained in a predetermined reaction vessel. The zinc and iron powders dried after hydrolysis were subjected to thermal-treatment at about 350° C., thereby obtaining a zinc oxide powder doped with an iron having a nano-sized bar-form. Each relative amount of an iron oxide and a zinc oxide which are contained within the zinc oxide powder doped with an iron was measured in the same manner as in Example 1, and the results are shown in Table 2 below.

EXAMPLE 9

About 4 g of the nano-sized zinc powder and about 0.8 g of the nano-sized iron powder were added to about 1000 g of the distilled water at about 60° C. and contained in a predetermined reaction vessel. The zinc and iron powders dried after hydrolysis were subjected to thermal-treatment at about 350° C., thereby obtaining a zinc oxide powder doped with an iron having a nano-sized bar-form. Each relative amount of an iron oxide and a zinc oxide which are contained within the zinc oxide powder doped with an iron was measured in the same manner as in Example 1, and the results are shown in Table 2 below.

TABLE 2

|  | Example 7 | Example 8 | Example 9 |
|---|---|---|---|
| Temperature of dispersed solution (° C.) | 60 | 60 | 60 |
| Amount of iron oxide within zinc oxide powder (%) | 0 | 0 | 3 |
| Amount of zinc oxide within zinc oxide powder (%) | 100 | 100 | 97 |

As can be seen in Table 2, in the case of Examples 7 and 8 in which a temperature of thermal-treatment was about 350° C., an iron oxide was not contained within the manufactured powder, and thus, it was found that the iron oxide was doped within the zinc oxide by the thermal-treatment.

EXAMPLE 10

About 1 g of nano-sized copper powder was added to about 1000 g of distilled water at about 40° C. and contained in a predetermined reaction vessel. Here, the nano-sized copper powder which was manufactured by the gas condensation technique had a spherical shape, and whose specific surface area was about 17 m²/g measured by the BET technique. The copper powder was dispersed by performing ultrasonic treatment on the reaction vessel for about 10 minutes, thereby preparing a dispersed solution. Next, an acetic acid of about 0.4 mL acting as a catalyst for oxidization reaction was added to the dispersed solution, and the dispersed solution was stirred for 6 hours while maintaining a temperature of the dispersed solution at about 40° C., thereby precipitating a copper (I) oxide. Next, the precipitated copper (I) oxide was collected, filtered through a filter paper having a plurality of pores of about 0.1 μm formed thereon, and washed with purified water. Next, the washed copper (I) oxide was dried in an oven heated to about 40° C. for about 12 hours, thereby obtaining a nano-sized copper (I) oxide powder having a cube-form.

Figure 5:
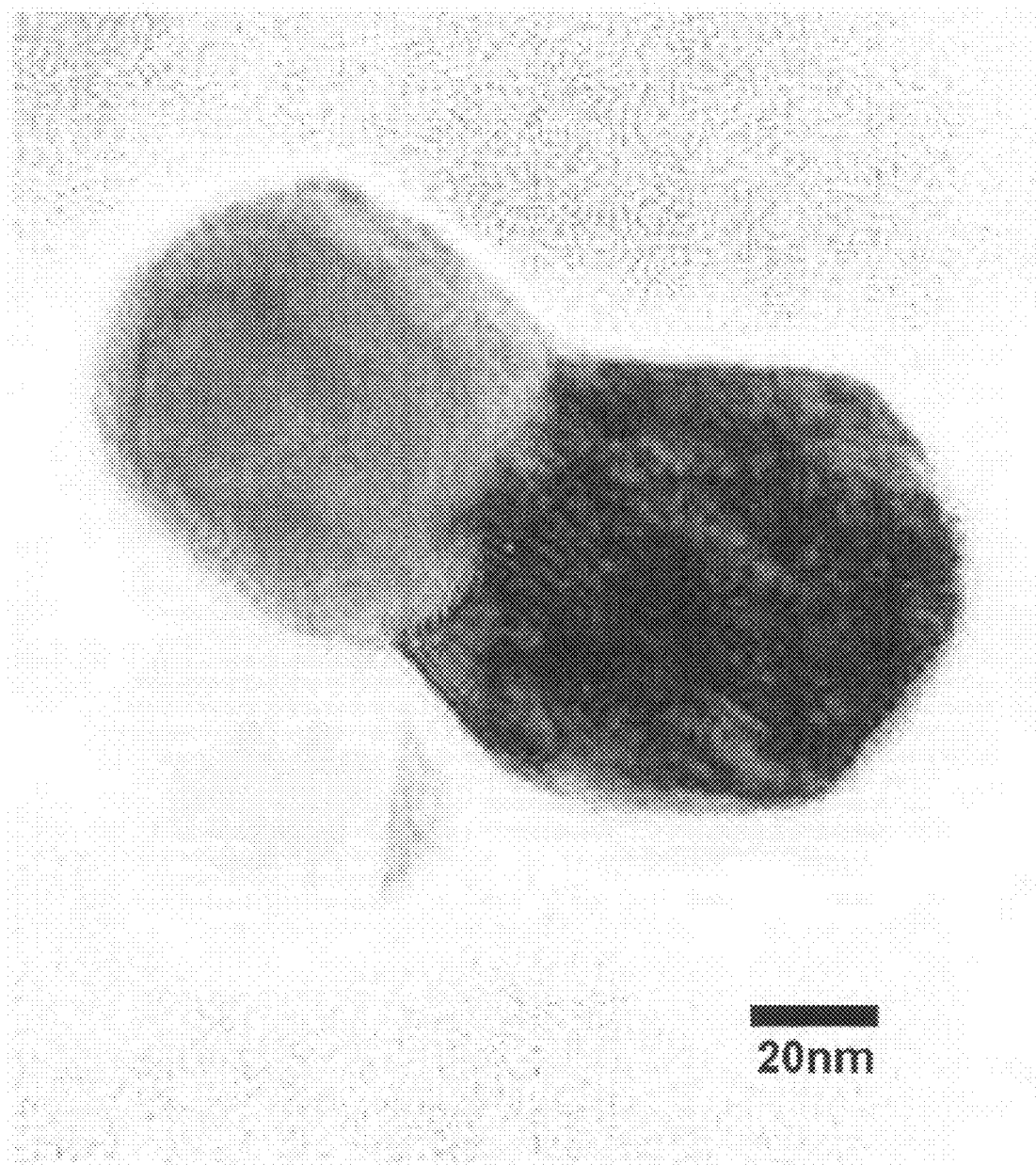
FIG. 5 is a photograph taken by a transmission electron microscope showing a copper (I) oxide ($Cu_2O$) powder having a nano-sized cube form according to Example 10.

The morphology and the particle sizes of the copper (I) oxide powder were observed by a transmission electron microscope (JEM2000, JEOL, Japan), which is shown in a photograph of FIG. 5. Here, the observation magnification was 300,000 times, and a particle of the copper (I) oxide powder was formed into a cube-shape. An average length of the particle of the copper (I) oxide powder was about 20 nm.

EXAMPLE 11

About 1 g of nano-sized aluminum powder was added to about 1000 g of the distilled water at about 40° C. and contained in a predetermined reaction vessel. Here, the nano-sized aluminum powder which was manufactured by the electrical explosion technique had a spherical shape, and whose particle size was about 80 to 120 nm measured by the BET technique. The aluminum powder was dispersed by performing ultrasonic treatment on the reaction vessel for about 10 minutes, thereby preparing a dispersed solution. Next, the dispersed solution was stirred for 6 hours while maintaining a temperature of the dispersed solution at about 40° C., thereby precipitating an aluminum hydroxide. Next, the precipitated aluminum hydroxide was collected, filtered through a filter paper having a plurality of pores of about 0.1 μm formed thereon, and washed with purified water. Next, an aluminum hydroxide powder dried in an oven heated to about 40° C. for about 12 hours is inserted into an electric furnace, and then subjected to thermal-treatment at about 350° C. for about one hour, thereby obtaining a nano-sized alumina powder having a fiber-form.

Figure 6:
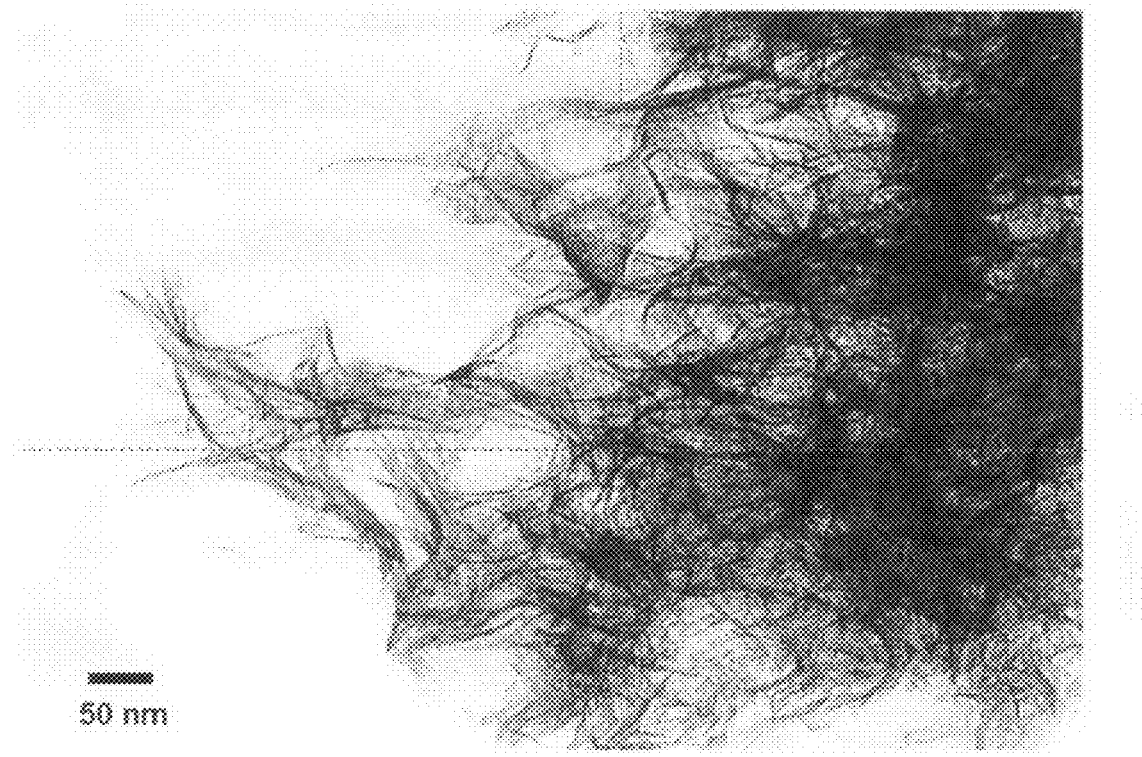
FIG. 6 is a photograph taken by a transmission electron microscope showing an alumina powder having a nano-sized fiber form according to Example 11.

The morphology and the particle sizes of the alumina powder were observed by a transmission electron microscope (JEM2000, JEOL, Japan), which is shown in a photograph of FIG. 6. Here, the observation magnification was 100,000 times, and a particle of the alumina powder was formed into a fiber-shape.

EXAMPLE 12

Figure 7:
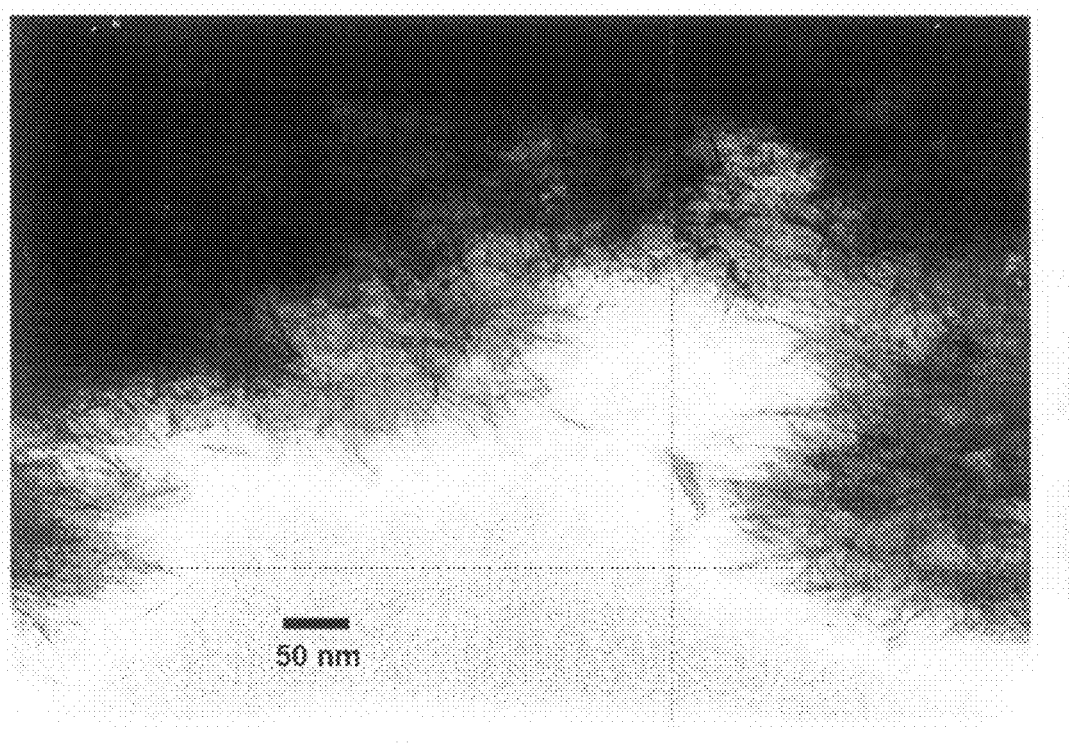
FIG. 7 is a photograph taken by a transmission electron microscope showing an alumina powder having a nano-sized fiber form according to Example 12.

An alumina powder was manufactured in the same manner as in Example 11 except that a temperature of the dispersed solution was about 80° C. during the precipitation reaction. The morphology and the particle sizes of the alumina powder were observed by a transmission electron microscope (JEM2000, JEOL, Japan), which is shown in a photograph of FIG. 7. Here, the observation magnification was 100,000 times.

EXAMPLE 13

About 1 g of nano-sized iron powder was added to about 1000 g of distilled water at about 40° C. and contained in a predetermined reaction vessel. Here, the nano-sized iron powder which was manufactured by the electrical explosion technique had a spherical shape, and whose particle size was about 80 to 120 nm measured by the BET technique. The iron powder was dispersed by performing ultrasonic treatment on the reaction vessel for about 10 minutes, thereby preparing a dispersed solution. Next, an acetic acid of about 1 mL was added to the dispersed solution, and the dispersed solution was stirred for 6 hours while maintaining a temperature of the dispersed solution at about 40° C., thereby precipitating a precipitation.

Figure 10:
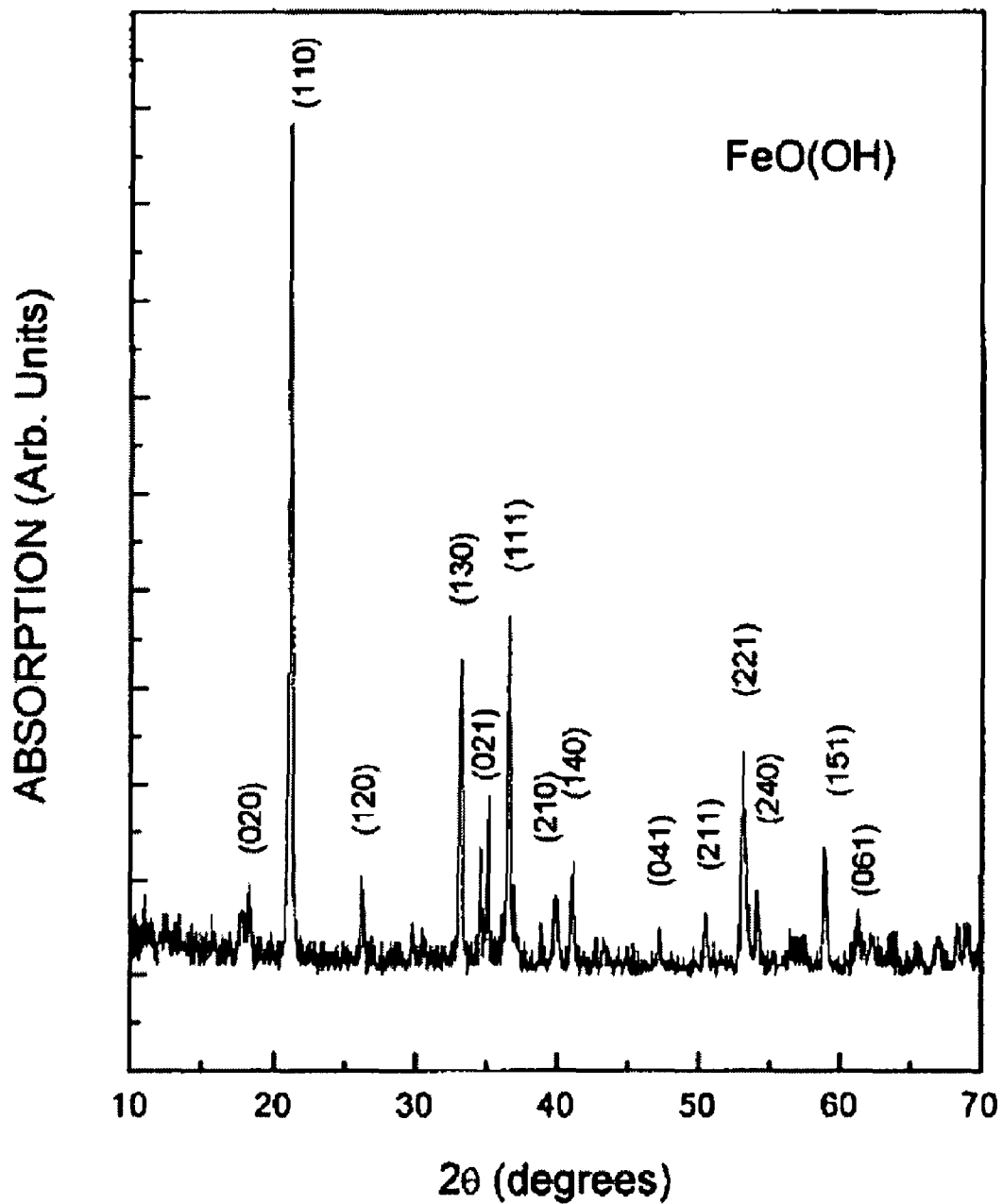
FIG. 10 is a graph illustrating a result of X-ray diffraction analysis of a precipitation generated in Example 13.

Here, it was found that the precipitation was an iron oxy-hydroxide by performing X-ray diffraction analysis with respect to the precipitation. An X-ray diffraction graph of the precipitation is shown in FIG. 10.

Next, the precipitated iron oxy-hydroxide was collected, filtered through a filter paper having a plurality of pores of about 0.1 μm formed thereon, and washed with purified water. Next, an iron oxide hydrate dried in an oven heated to about 40° C. for about 12 hours is inserted into an electric furnace, and then subjected to thermal-treatment at about 300° C. for about one hour, thereby obtaining a nano-sized iron oxide powder having a bar-form.

Figure 8:
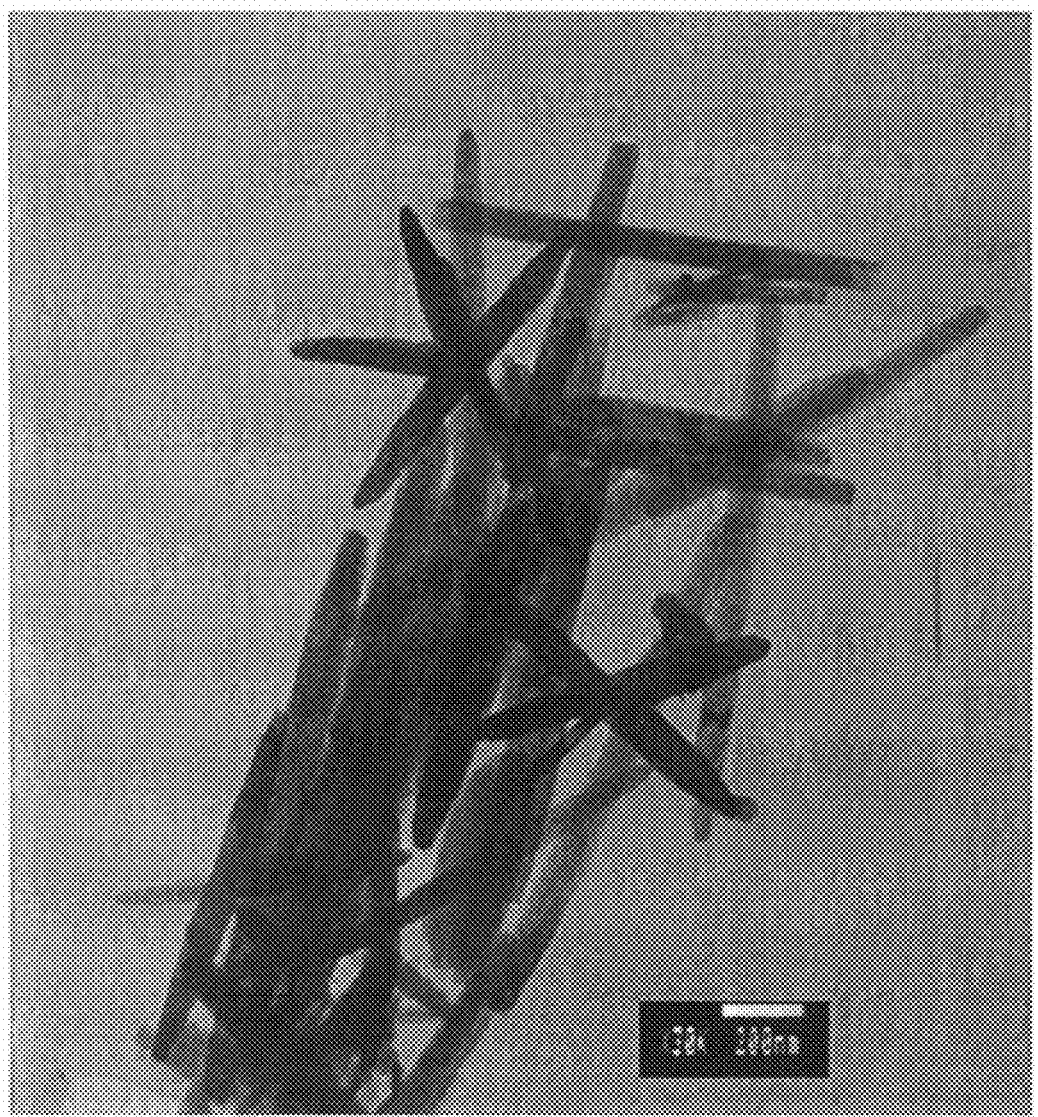
FIGS. 8 and 9 are photographs taken by a transmission electron microscope showing an iron oxide powder having a nano-sized bar-form according to Example 13.
Figure 9:
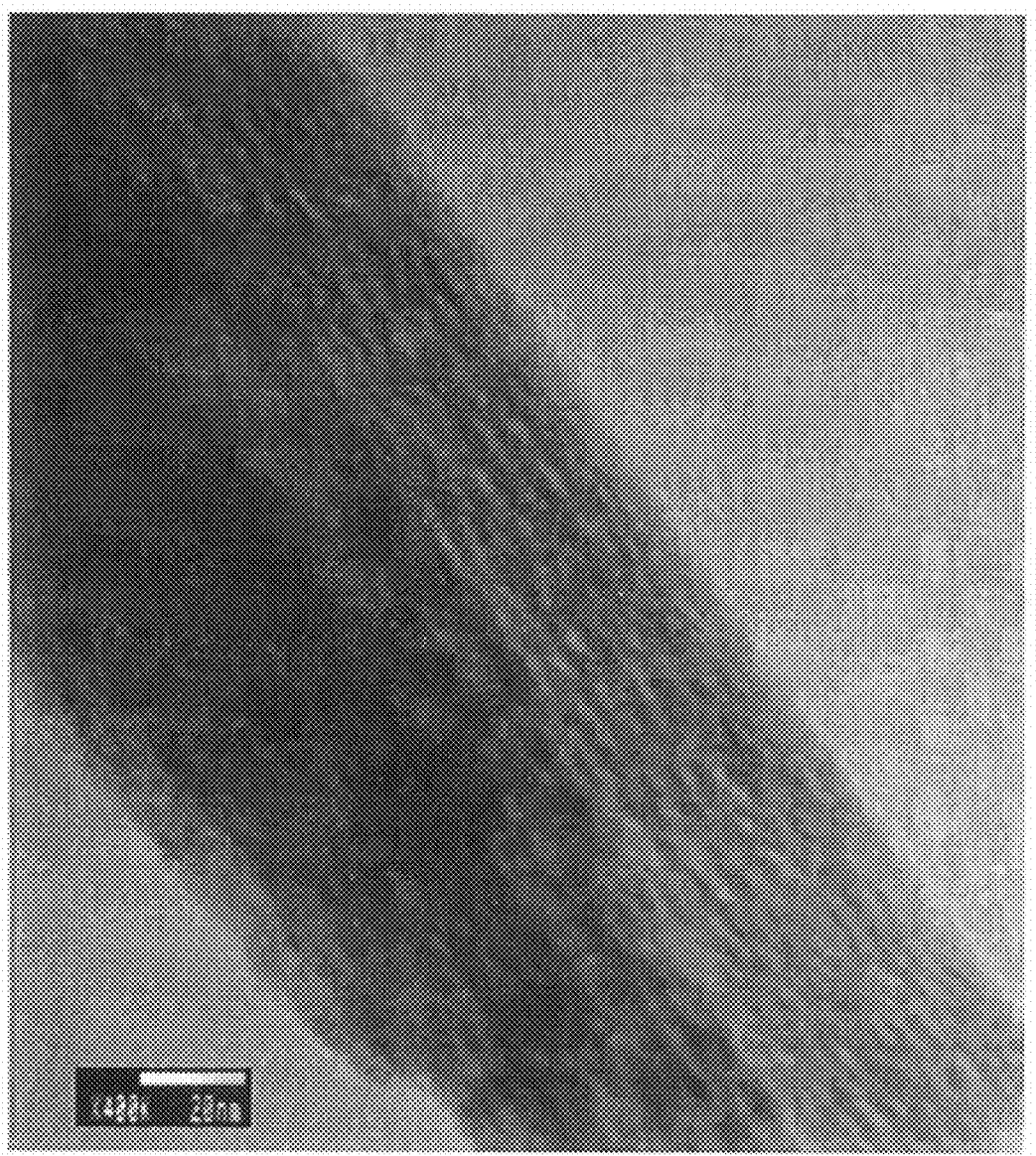

The morphology and the particle sizes of the iron oxide powder were observed by a transmission electron microscope (JEM2000, JEOL, Japan), which is shown in a photograph of FIG. 8. Here, the observation magnification was 30,000 times. Also, the iron oxide powder was observed with the observation magnification of 400,000 times, and shown in FIG. 9. As shown in FIGS. 8 and 9, a thickness of the iron oxide powder was about 30 to 80 nm, and a length thereof was about 500 to 800 nm. Also, the iron oxide powder was formed into an acicular bar-shape.

EXAMPLE 14

About 3 g of the nano-sized iron powder was added to about 1000 g of the distilled water at about 40° C. and contained in a predetermined reaction vessel. Here, the nano-sized iron powder which was manufactured by the electrical explosion technique had a spherical shape, and whose particle size was about 80 to 120 nm measured by the BET technique. The iron powder was dispersed by performing ultrasonic treatment on the reaction vessel for about 10 minutes, thereby preparing a dispersed solution. Next, an acetic acid of about 1 mL was added to the dispersed solution, and the dispersed solution was stirred for 6 hours while maintaining a temperature of the dispersed solution at about 40° C., thereby precipitating a precipitation.

Figure 11:
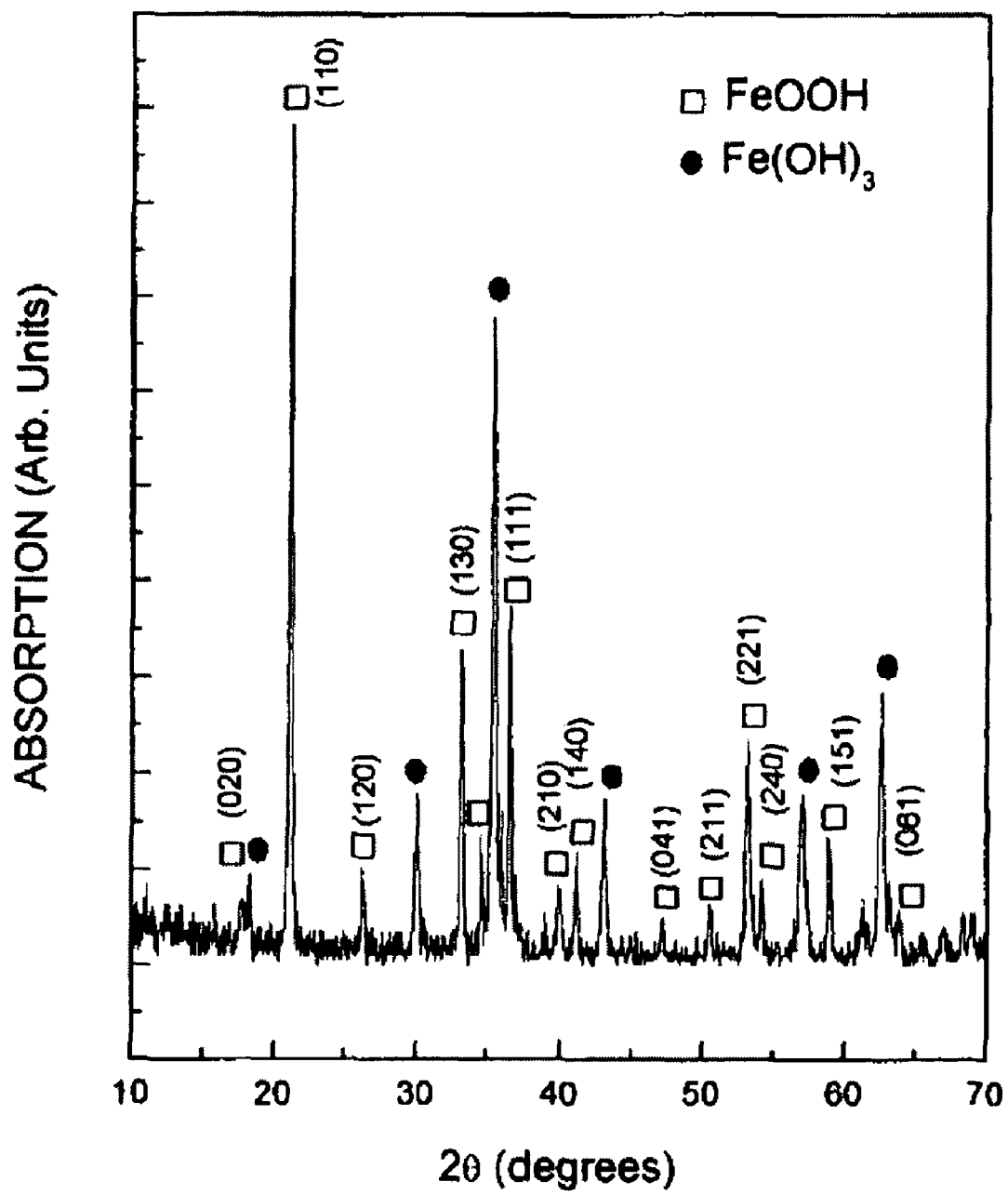
FIG. 11 is a graph illustrating a result of X-ray diffraction analysis of a precipitation generated in Example 14.

Here, it was found that the precipitation was a mixed form of an iron oxy-hydroxide and iron (I) hydroxide by performing X-ray diffraction analysis with respect to the precipitation. An X-ray diffraction graph of the precipitation is shown in FIG. 11.

Hereinafter, the metal oxide nano power according to the present invention will be described.

According to the metal oxide nano powder of the present invention, a nano-sized metal powder is subjected to a precipitation reaction at a relatively low temperature by adding the metal powder to water, thereby generating a nano-sized metal oxide powder. Here, the generated metal oxide powder has any one of a bar-form, a cube-form, and a fiber-form. For example, a zinc oxide powder is formed into a nano-sized bar-shape having an average thickness of about 30 to 80 nm and an average length of about 300 to 600 nm. The zinc oxide powder may be doped with at least one metal selected from the group consisting of iron, manganese, nickel, cobalt, chrome, titanium, niobium, indium, zirconium, and aluminum.

An iron oxide powder is formed into a nano-sized bar shape having an average diameter of about 30 to 80 nm and an average length of about 500 to 800 nm. An alumina powder is formed into a nano-sized fiber shape having an average diameter of about 2 to 4 nm and an average length of about 20 to 100 nm. A copper (I) oxide powder has a lattice structure of cubic system with $a_o$=4.264 Å (where "$a_o$" denotes a lattice parameter), a diameter of about 20 to about 50 nm, and a shape of a cube-form.

According to the present invention, the metal oxide powder is readily generated through a low temperature precipitation method by using a nano-sized metal powder. The metal oxide nano powder according to the present invention has a relatively large specific surface area, and is formed into a bar-shape, a cube-shape, or a fiber-shape. Also, the metal oxide nano powder according to the present invention has excellent mechanical property, chemical property, and electrical property, so that it can be applicably used for a catalyst or a display element.

As described above, according to the present invention, the nano-sized metal oxide powder is readily and economically manufactured using a low energy method. The nano-sized metal oxide powder exhibits excellent catalytic activity, so that it can be used as a catalyst for separating hydrogen peroxide. Also, the metal oxide powder is used as a catalyst for decomposition of organic matters related to environmental pollution, filtering of a high functional filter, and formation of gas separation membranes, and also used for a sensor for caloric measurement. Also, according to the present invention, a zinc oxide powder having a nano-sized bar-form and doped with a metal can be manufactured, and the large-quantity production can be realized due to low energy consumption and simplification of the process.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of manufacturing a metal oxide nano powder, comprising: preparing a first dispersed solution by adding a nano-sized metal powder to water and dispersing the metal powder within the water;
   performing a hydration reaction of the first dispersed solution at a temperature of about 30 to about 70° C. to generate a precipitate; and
   filtering and drying the precipitate to prepare a metal oxide powder, wherein
   the preparing of the first dispersed solution comprises adding about 0.1 to about 1 part by weight of the metal powder to about 100 parts by weight of the water.

2. The method of claim 1, wherein the metal oxide nano powder comprises at least one metal selected from the group consisting of zinc, copper, iron, and aluminum.

3. The method of claim 1, wherein a diameter of the metal powder is about 1 to about 500 nm.

4. The method of claim 1, wherein the hydration reaction is performed for about 1 to about 40 hours.

5. The method of claim 1, wherein the preparing of the first dispersed solution further comprises adding an additive to the first dispersed solution.

6. The method of claim 5, wherein the additive includes acetic acid.

7. The method of claim 1, wherein the metal oxide nano powder has any one of a bar-form, a cube-form, and a fiber-form.

8. The method of claim 7, wherein the metal oxide nano powder with the bar-form has an average thickness of about 30 to about 80 nm, and an average length of about 300 to about 800 nm.

9. The method of claim 7, wherein the metal oxide nano powder with the cube-form has a cubic crystal structure and a diameter of about 20 to about 50 nm.

10. The method of claim 7, wherein the metal oxide nano powder with the fiber-form has an average diameter of about 2 to about 4 rim and an average length of about 20 to about 100 nm.

11. The method of claim 1, wherein the method of manufacturing a metal oxide nano powder further comprises thermally treating the metal oxide powder at a temperature of about 100 to about 600° C. after the drying.

12. The method of claim 11, wherein the thermally treating is performed for about 0.5 to about 2 hours.

13. A method of manufacturing a zinc oxide nano powder doped with a metal, comprising: preparing a first dispersed solution by adding a nano-sized zinc powder and a nano-sized doping metal powder to water and dispersing the zinc powder and the metal powder with water;
   generating a zinc oxide precipitate by stirring the first dispersed solution at a temperature of about 30 to about 70° C. for a predetermined time period; and
   filtering and drying the zinc oxide precipitate to prepare a zinc oxide nano powder doped with a metal.

14. The method of claim 13, wherein the doping metal powder comprises at least one metal selected from the group consisting of iron, manganese, nickel, cobalt, chromium, titanium, niobium, indium, zirconium, and aluminum.

15. The method of claim 13, wherein the doping metal powder of about 3 to about 10 wt % is added with respect to the zinc powder.

16. The method of claim 13, wherein the preparing of the zinc oxide nano powder doped with a metal further comprises thermally treating after the drying.

17. The method of claim 16, wherein the thermally treating is performed at a temperature of about 100 to about 400° C.

* * * * *